United States Patent
Naito

(10) Patent No.: US 8,208,743 B2
(45) Date of Patent: Jun. 26, 2012

(54) IMAGE DECODING APPARATUS AND CONTROL METHOD

(75) Inventor: Satoshi Naito, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 715 days.

(21) Appl. No.: 12/409,610

(22) Filed: Mar. 24, 2009

(65) Prior Publication Data

US 2009/0257667 A1 Oct. 15, 2009

(30) Foreign Application Priority Data

Apr. 15, 2008 (JP) ................... 2008-106113

(51) Int. Cl.
*G06K 9/36* (2006.01)
*G06K 9/46* (2006.01)

(52) U.S. Cl. .................. 382/233; 382/232; 382/235

(58) Field of Classification Search .............. 382/233, 382/232, 235
See application file for complete search history.

(56) References Cited

U.S. PATENT DOCUMENTS

| | | | |
|---|---|---|---|
| 6,336,180 B1 * | 1/2002 | Long et al. | 712/34 |
| 7,106,909 B2 | 9/2006 | Satoh et al. | 382/239 |
| 7,215,818 B2 | 5/2007 | Naito | 382/239 |
| 2001/0021971 A1 * | 9/2001 | Gibson et al. | 712/215 |
| 2002/0006228 A1 * | 1/2002 | Suzuki et al. | 382/233 |
| 2002/0057446 A1 * | 5/2002 | Long et al. | 358/1.13 |

FOREIGN PATENT DOCUMENTS

| | | |
|---|---|---|
| JP | 8-032821 | 2/1996 |
| JP | 2001-086318 A | 3/2001 |
| JP | 2002-026737 | 1/2002 |

OTHER PUBLICATIONS

English translation of Japan 8-032821, Feb. 2, 1996.
English translation of Japan 2002-026737, Jan. 25, 2002.

* cited by examiner

*Primary Examiner* — Bernard Krasnic
(74) *Attorney, Agent, or Firm* — Fitzpatrick, Cella, Harper & Scinto

(57) ABSTRACT

An apparatus and method enables effectively executing decoding processing in units of blocks based on encoded image data that has been variable-length encoded in units of blocks and furthermore has marker code inserted therein. An identification unit generates information indicating the position of an emulation prevention byte and deletes the emulation prevention byte. A code length calculation unit outputs a code length of the encoded image data from which the identification data has been deleted. A code length accumulation unit determines, based on the identification data position information, whether identification data was included in the encoded image data that has been decoded, and accumulates the code lengths of encoded data and outputs the accumulated code length in units of blocks. Based on this, storage address information for encoded data in blocks in the encoded image data is registered in a decoding table which is used for performing in units of blocks.

6 Claims, 14 Drawing Sheets

FIG. 3A

```
  F    0    A    E    F    F    0    0
1111_0000_1010_1110_1111_1111 | 0000_0000 | 0000_0000 | 0111_0000_1111_1111 | 0100_1011
                                              \ /
                                               0
                                    EMULATION PREVENTION BYTE
                                                                ENCODED IMAGE DATA
```

FIG. 3B

```
1111_0000_1010_1110_1111_1111 | 0111_0000_1111_1111 | 0100_1011
└──── CODE AT END OF MCU ────┘
ENCODED IMAGE DATA AFTER DELETION OF EMULATION PREVENTION BYTE
```

FIG. 3C

```
0000_0000_0000_0000_0000_0001 | 0000_0000_0000_0001 | 0000_0000
                                          └─ BIT POSITION IMMEDIATELY BEFORE "0X00" (LSB OF "0XFF")
EMULATION PREVENTION BYTE POSITION DATA
```

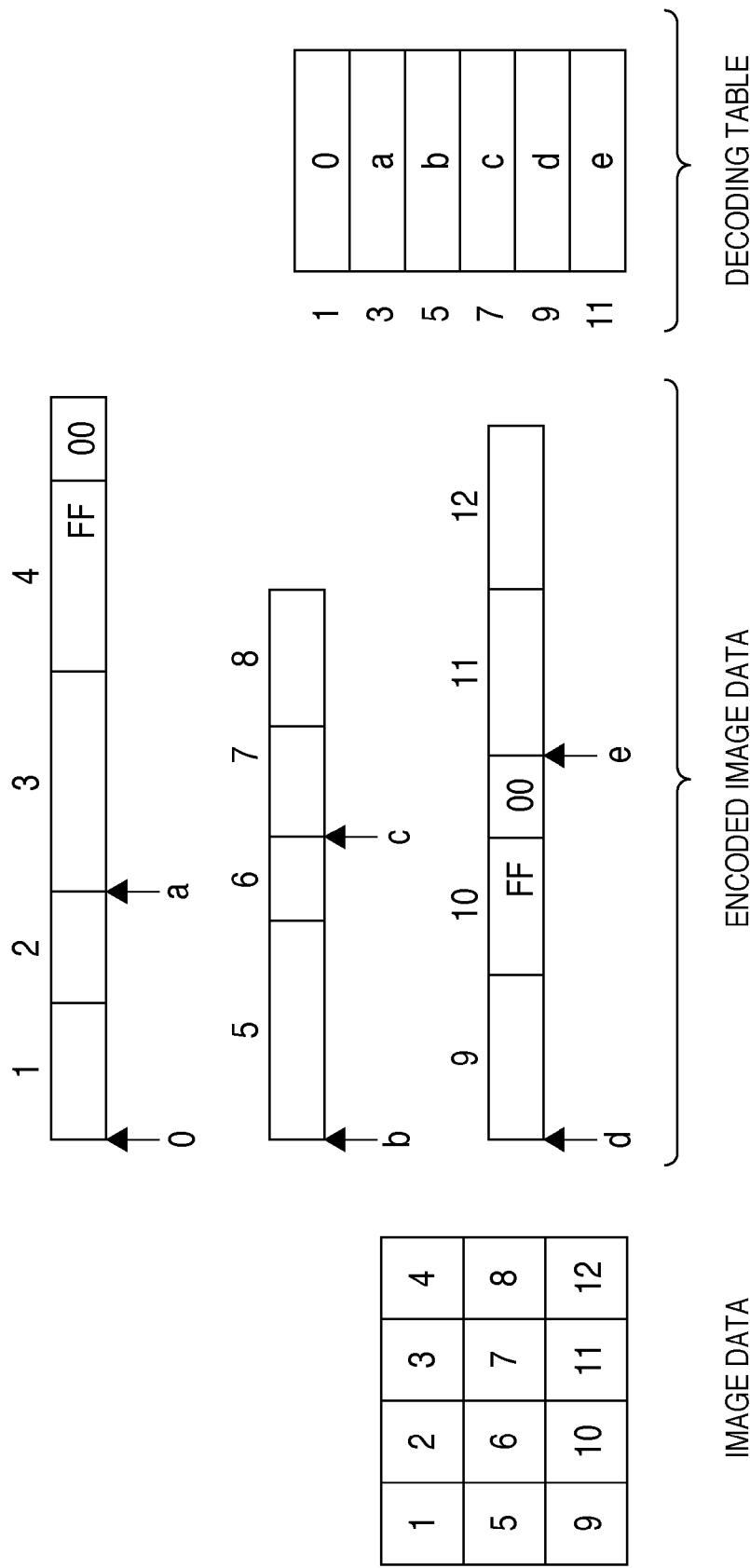
FIG. 4C  DECODING TABLE
FIG. 4B  ENCODED IMAGE DATA
FIG. 4A  IMAGE DATA

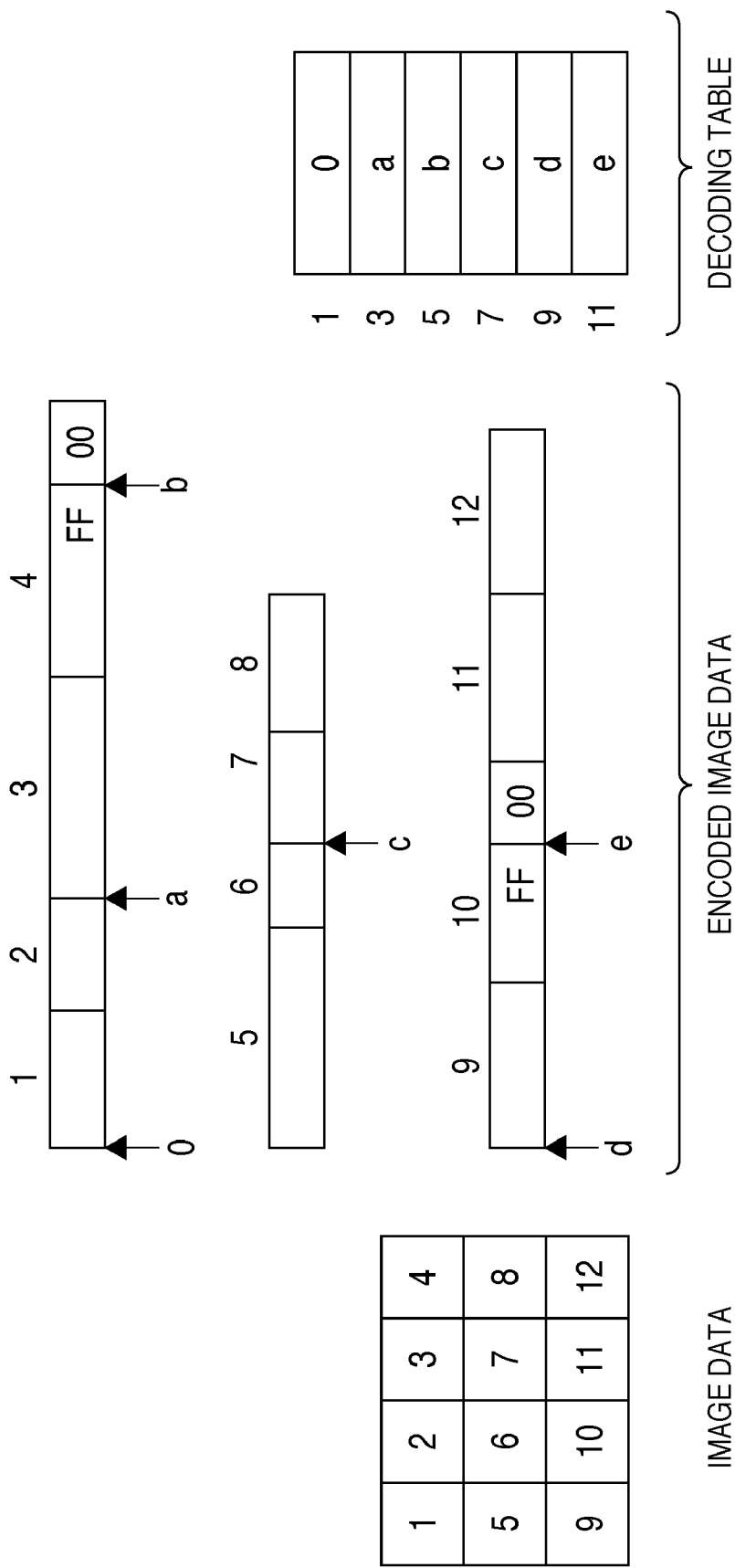

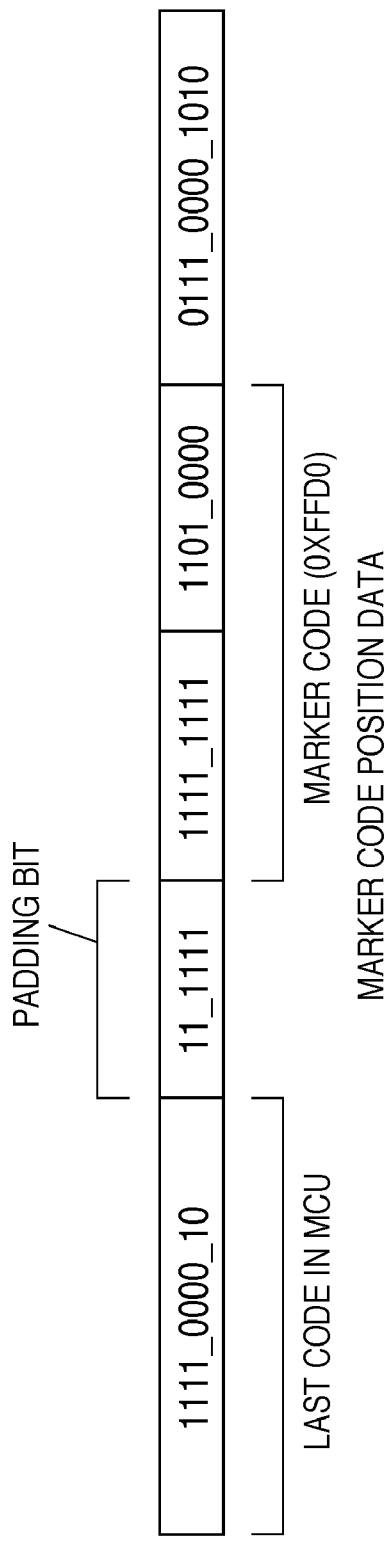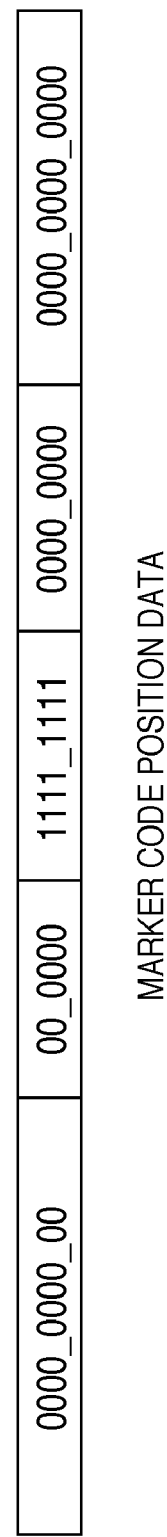
FIG. 8A
FIG. 8B

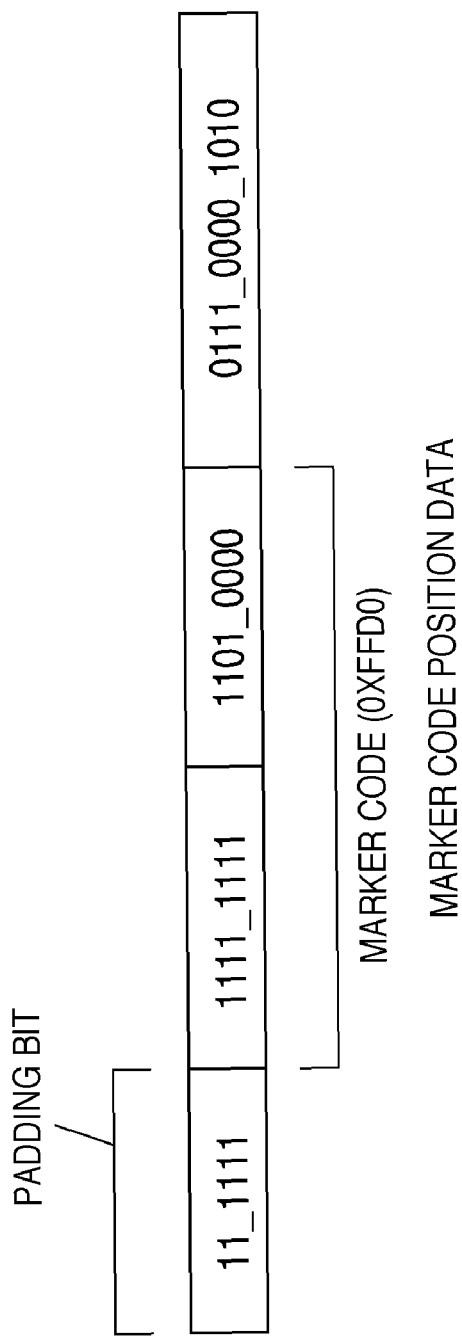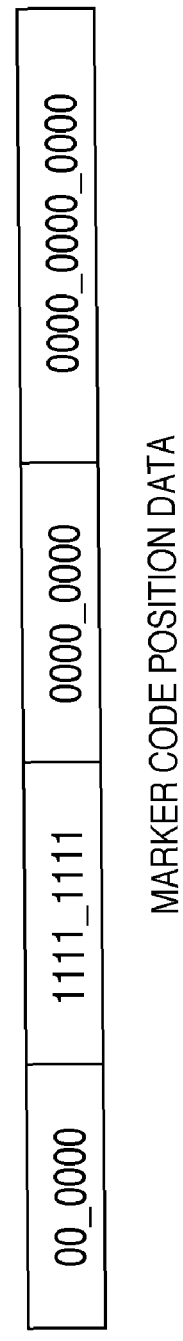
FIG. 9A
FIG. 9B

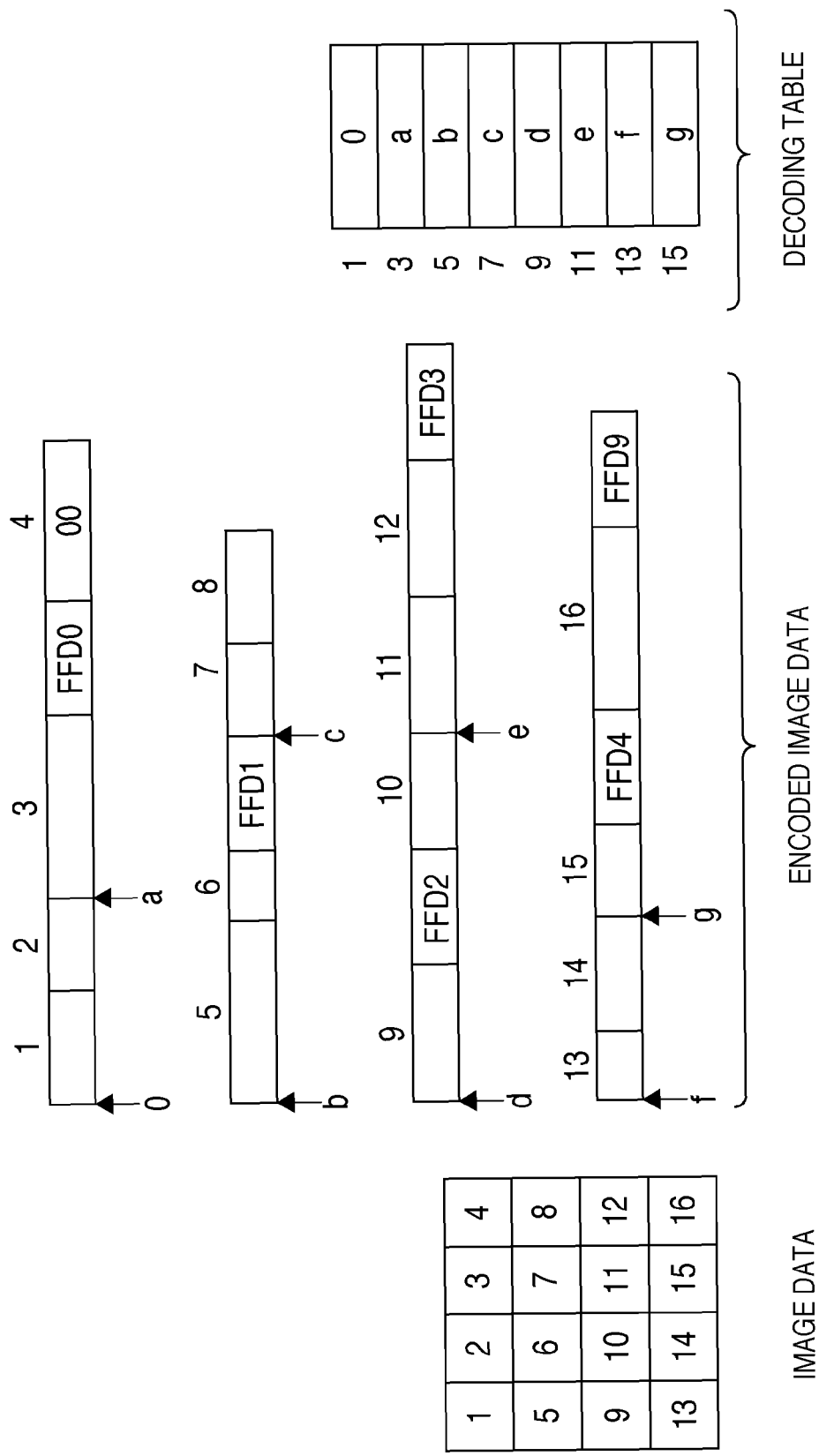

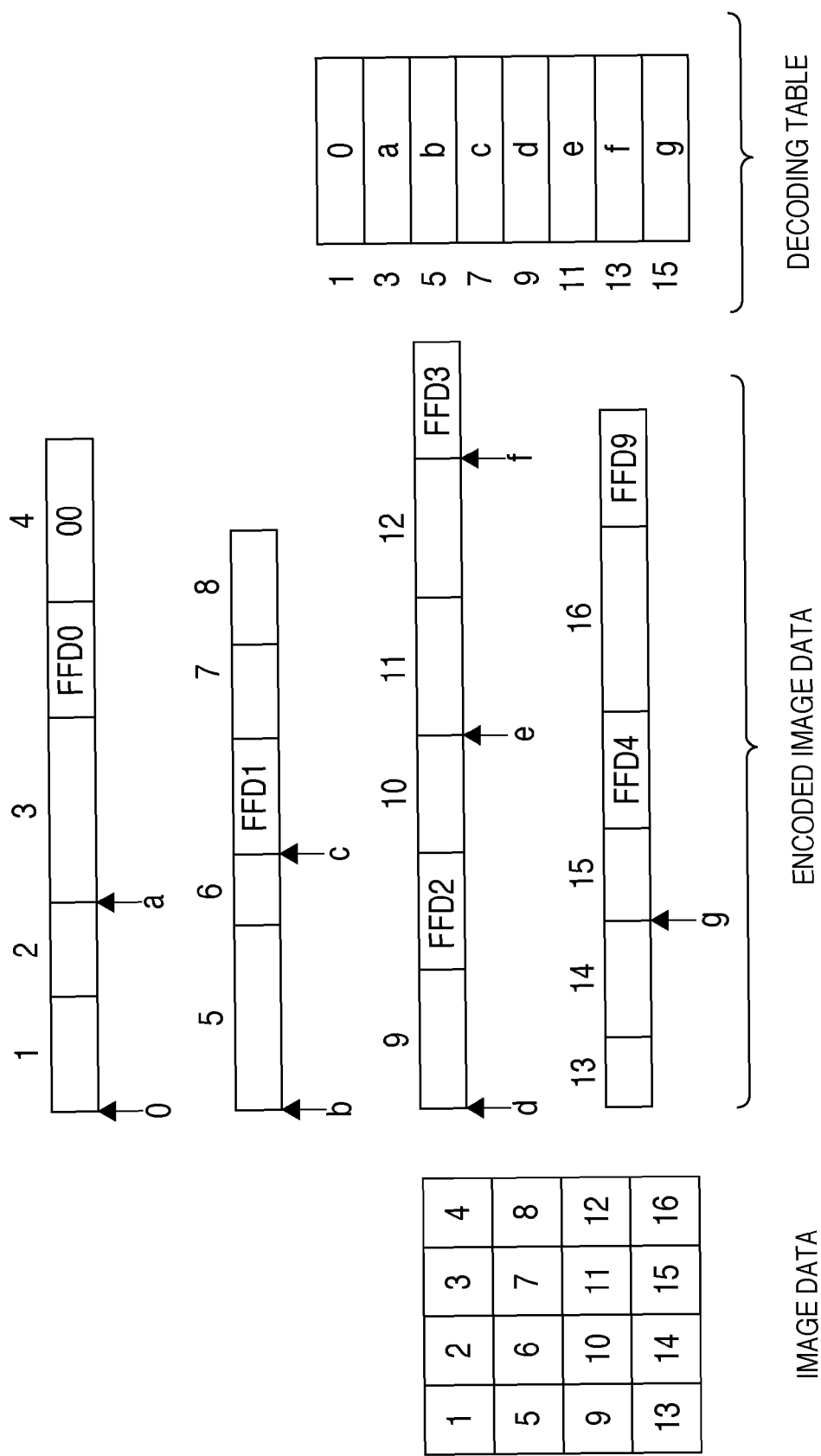

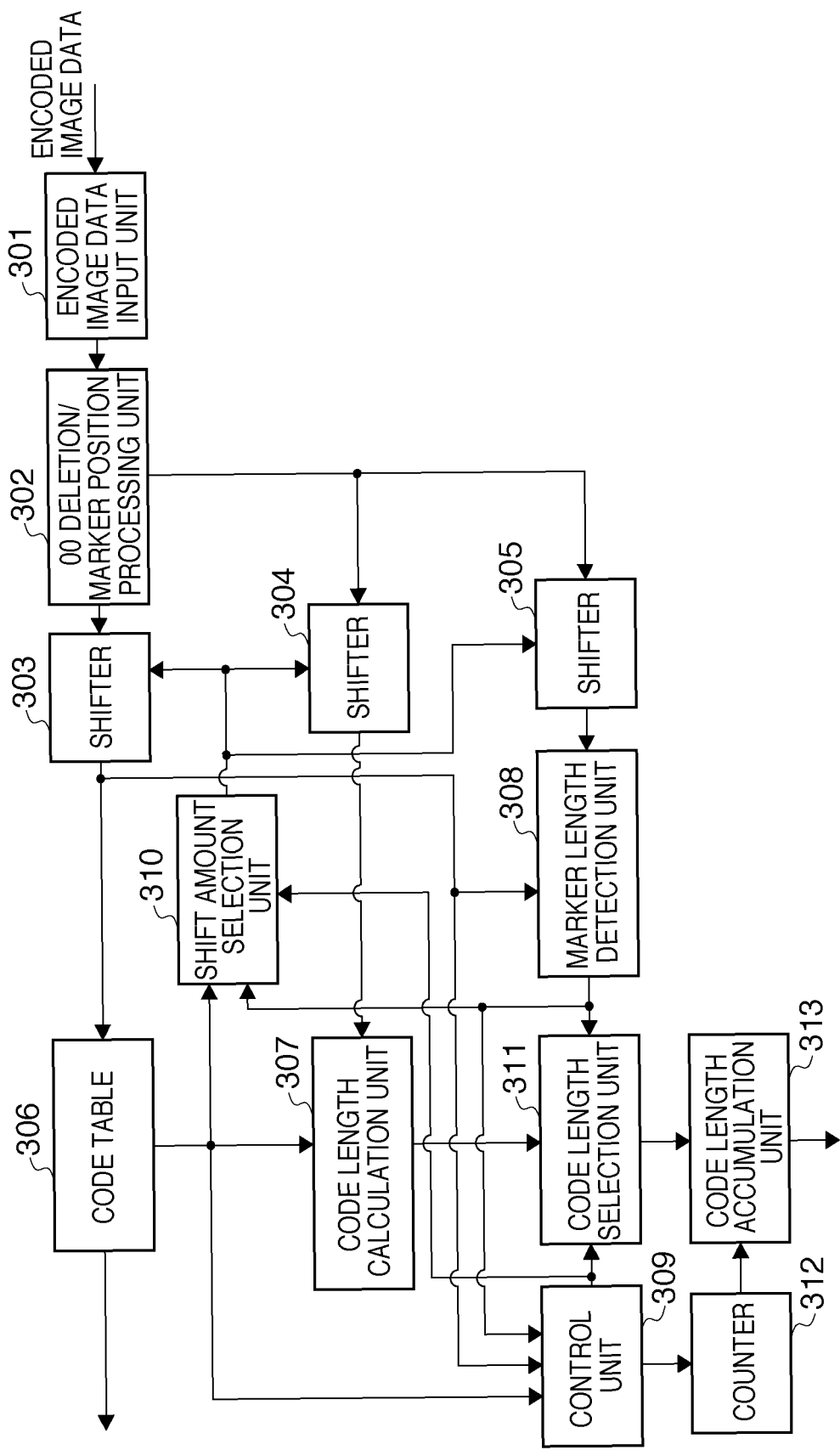

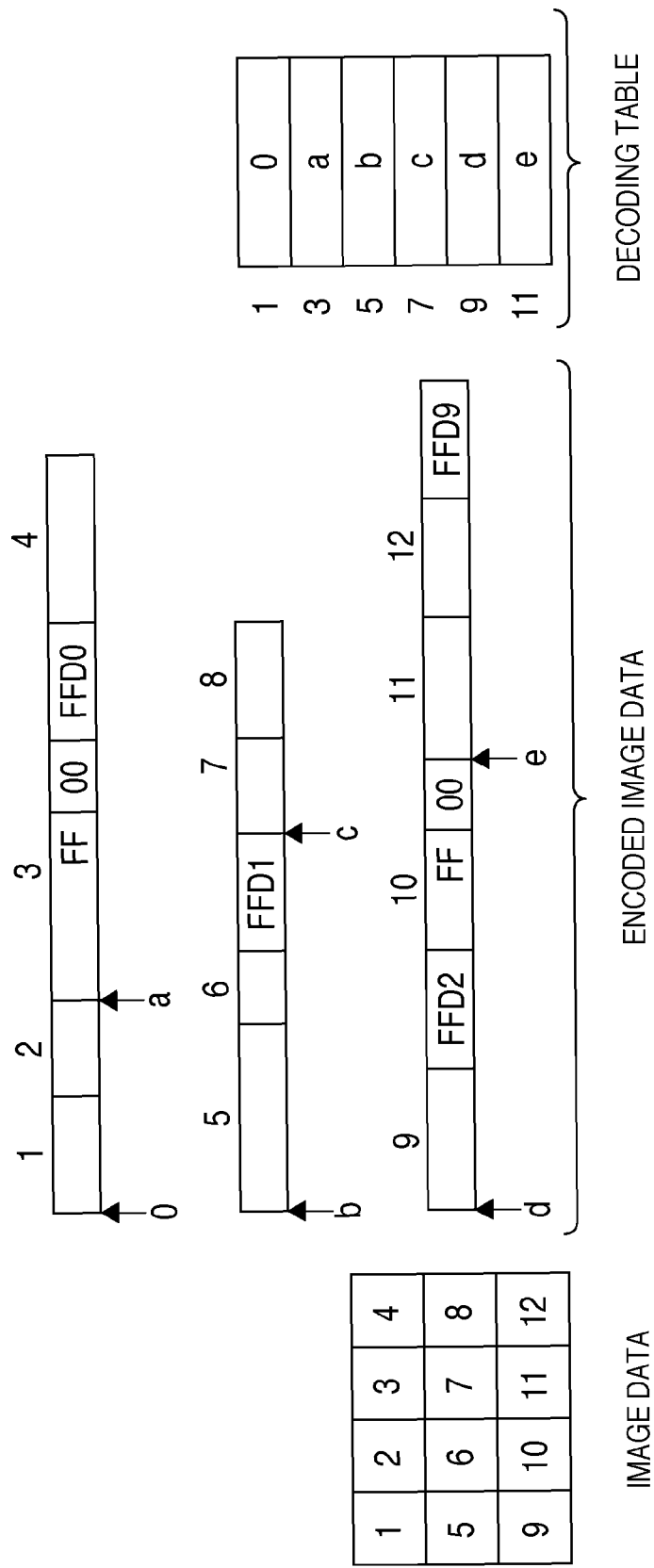

IMAGE DECODING APPARATUS AND CONTROL METHOD

BACKGROUND OF THE INVENTION

1. Field of the Invention

The present invention relates to technology for decoding image data that has been encoded in units of blocks.

2. Description of the Related Art

Many digital cameras that have become widely used in recent years employ JPEG as technology for performing compression-coding on still images that have been captured.

The following is a brief description of JPEG encoding technology. First, image data that is to be encoded is divided into units of blocks that are each 8×8 pixels. Discrete cosine transformation (DCT) is then performed on the blocks to generate transform coefficient blocks. Thereafter, transform coefficients in the transform coefficient blocks are quantized. The post-quantization transform coefficients are then scanned in a given order, and encoding is performed by assigning variable length code to pairs of the number of transform coefficients that are a series of zeroes and a transform coefficient that is a value other than zero. This processing is executed for each block, thus generating JPEG encoded image data (hereinafter, called "JPEG image data").

When decoding JPEG image data, there are cases in which there is a desire to rotate the image by a predetermined angle. For example, in an imaging device included in a digital camera, the number of pixels in the horizontal direction is generally higher than the number of pixels in the vertical direction, and in JPEG encoding processing, raster scanning is performed in units of 8×8-pixel blocks before encoding. However, in a case of printing using a printer, the recordable width is the short side of the largest recordable recording sheet in order to prevent an increase in the size of the apparatus (to reduce cost). In other words, in a case of printing using a printer, JPEG image data that has been captured by a digital camera is rotated 90 degrees before print processing is performed thereon. Alternatively, depending on the margin (cut-off line) setting of the recording sheet, the JPEG image data may be output in a 180-degree or 270-degree rotated condition.

One easily conceivable method for meeting such a demand involves first decoding all of the targeted JPEG image data, and then performing rotating processing for rotating the image by a predetermined angle.

However, this method is problematic due to not only requiring a high-capacity memory for temporarily holding the entirety of the decoded image, but also due to the fact that there is an increase in the time required to perform the rotating processing since the rotating processing is performed on a large amount of image data.

Japanese Patent Laid-Open No. 2001-86318 is an example of a document disclosing technology for solving such problems.

According to this document, provisional decoding processing is first performed on encoded image data in order from the beginning, and a table holding decoding information necessary for decoding a predetermined origin block in the original image (hereinafter, called the "decoding table") is generated. Thereafter, the encoded image data is decoded from the origin block using the decoding table, and the decoded image data is rotated by a predetermined angle and output to an image buffer. By performing the above processing, the original image is rotated by a predetermined angle, and in this condition, the image data can be decoded in order beginning with a block positioned at the head of the recording sheet feed, and the result of such decoding can be output.

The decoding information necessary to decode the predetermined origin block is a file pointer indicating the origin block and a prediction value that is necessary to decode the origin block. In the JPEG encoding scheme, the prediction value that is necessary is the DC component value of a block positioned immediately before the origin block.

In general, code called RST markers used in recovery from data errors and EOI markers indicating the end of encoded image data are appended to encoded image data typified by, for example, the JPEG encoding scheme. Note that in the following description, such code is called "marker code".

Marker code is inserted at byte boundaries in encoded image data. Also, in order to prevent the emulation of marker code, predetermined byte values are inserted in encoded data strings expressing image data. For example, in the JPEG encoding scheme, the marker code is code that begins with "0xFF" ("0x" indicates hexadecimal notation). The RST marker code is "0xFFD0" to "0xFFD7", and the EOI marker code is "0xFFD9". If "0xFF" appears at a byte boundary in a data string expressing image data, "0x00" is inserted after "0xFF" in order to prevent emulation of such a marker code. Note that in the following description, "0x00" that is inserted after "0xFF" is called an "emulation prevention byte".

A specific method for processing emulation prevention bytes is not clear in conventional technology. For example, consider the case of a JPEG image that, as shown in FIG. 4A, has been divided into four pixel blocks in the horizontal direction and three pixel blocks in the vertical direction (each block including 8×8 pixels). The numerals noted in the sections in FIG. 4A indicate the order in which the pixel blocks were encoded. In the JPEG image shown in FIG. 4A, if the width of the area to be output is set to a unit of two blocks in the horizontal direction, it is necessary to obtain the positions (file pointers) indicated by "0" to "e" in FIG. 4B. In other words, it is necessary to create the decoding table shown in FIG. 4C.

However, if positions ("b" and "e" in FIG. 5B) immediately before emulation prevention bytes are set, "0xFF" is not input to an image decoding apparatus, and "0x00" is set as the encoded image data start point corresponding to the origin block. In this case, the image decoding apparatus cannot determine whether "0x00" that has been input is an emulation prevention byte or a code word.

However, a specific solution for setting the positions indicated by "a" to "e" in FIG. 4B as file pointers indicating origin blocks is not disclosed in conventional technology.

Consider a case of processing emulation prevention bytes with use of an image decoding apparatus having the structure shown in FIG. 14. In FIG. 14, reference numeral 401 denotes an encoded image data input unit that inputs encoded data in bit order. Reference numeral 402 denotes a shifter that cues encoded image data. Reference numeral 403 denotes a 00 determination unit that determines whether an emulation prevention byte exists. Reference numeral 404 denotes a code table for performing decoding and outputting a code word length. Reference numeral 405 denotes a counter that counts the number of decoded transform coefficients and determines whether the end of a block has been decoded. Reference numeral 406 denotes a code length accumulation unit that accumulates code lengths from the code table.

In order to set file pointers at the positions indicated by "0" to "e" in FIG. 4B, first the counter 405 determines whether the end of a block has been decoded. It is necessary for the 00 determination unit 403 to determine whether an emulation prevention byte exists immediately after the code word at the end of the block, and for the shifter 402 to cue the encoded image data based on the determination result. According to this structure, in the case of implementation in an LSI, the critical path becomes too long, and high-speed operation at a high frequency becomes difficult, which is a problem.

A specific method for processing marker code is not clear in conventional technology. Consider a case in which file pointers for encoded image data shown in FIG. 11A are set as shown in FIG. 11B, and therefore the file pointers positioned immediately before marker code is registered in a decoding table as shown in FIG. 11C. If the blocks positioned immediately after the marker code "0xFFD1" and "0xFFD3" (block (7) and block (13) in FIG. 11A) are set as origins and decoding is performed in parts, the marker code is decoded again, thereby leading to an increase in the decoding processing time.

SUMMARY OF THE INVENTION

The present invention has been achieved in view of such problems, and provides decoding technology that enables efficiently executing decoding processing randomly in units of blocks based on encoded image data that has been variable-length encoded in units of blocks and furthermore has marker code inserted therein.

In order to solve such problems, an image decoding apparatus of the present invention has, for example, the structure described below.

In other words, an aspect of the present invention is an image decoding apparatus that decodes encoded image data, the encoded image data having been encoded in units of blocks and having predetermined identification data inserted therein, including: an identification data deletion unit that detects the identification data inserted in the encoded image data, outputs information indicating a position of the identification data, deletes the identification data inserted in the encoded image data, and outputs encoded image data from which the identification data has been deleted; a first decoding unit that decodes the encoded image data from which the identification data has been deleted by the identification data deletion unit, and outputs a code length; a determination unit that determines, based on the identification data position information output from the identification data deletion unit, whether the identification data was included in the encoded image data that has been decoded by the first decoding unit, and in the case of determining that the identification data was included, adds a length of the identification data to the code length output from the first decoding unit; an accumulation unit that accumulates the code length to which the length of the identification data has been added by the determination unit, and outputs the accumulated code length in units of blocks; a registration unit that, based on the code length output from the accumulation unit, registers storage address information pertaining to encoded data that corresponds to a predetermined block in the encoded image data in a decoding table; and a second decoding unit that decodes encoded image data in a predetermined number of blocks beginning with a position of the predetermined block, in accordance with the address information registered in the decoding table by the registration unit.

According to the present invention, decoding processing in units of blocks can be effectively executed randomly based on encoded image data that has been variable-length encoded in units of blocks and furthermore has marker code inserted therein.

Further features of the present invention will become apparent from the following description of exemplary embodiments with reference to the attached drawings.

BRIEF DESCRIPTION OF THE DRAWINGS

FIG. 3A to FIG. 3C are diagrams showing examples of data output by a 00 deletion unit of the image decoding apparatus according to Embodiment 1.

FIG. 4A to FIG. 4C are diagrams showing a decoding table created by the image decoding apparatus according to Embodiment 1, and a principle of its creation.

FIG. 5A to FIG. 5C are diagrams used in a description of problems in a decoding table created by an image decoding apparatus according to conventional technology.

FIGS. 8A and 8B are diagrams showing examples of data output by a marker position detection unit of the image decoding apparatus according to Embodiment 2.

FIGS. 9A and 9B are diagrams showing examples of data output by the marker position detection unit of the image decoding apparatus according to Embodiment 2.

FIG. 10A to FIG. 10C are diagrams showing a decoding table created by the image decoding apparatus according to Embodiment 2, and a principle of its creation.

FIG. 11A to FIG. 11C are diagrams showing a decoding table created by an image decoding apparatus according to conventional technology and related problems.

FIG. 12 is a block configuration diagram of an image decoding unit of an image decoding apparatus according to Embodiment 3.

FIG. 13A to FIG. 13C are diagrams showing a decoding table created by the image decoding apparatus according to Embodiment 3, and a principle of its creation.

DESCRIPTION OF THE EMBODIMENTS

The following describes details of embodiments according to the present invention with reference to the attached drawings.

Embodiment 1

Figure 2:
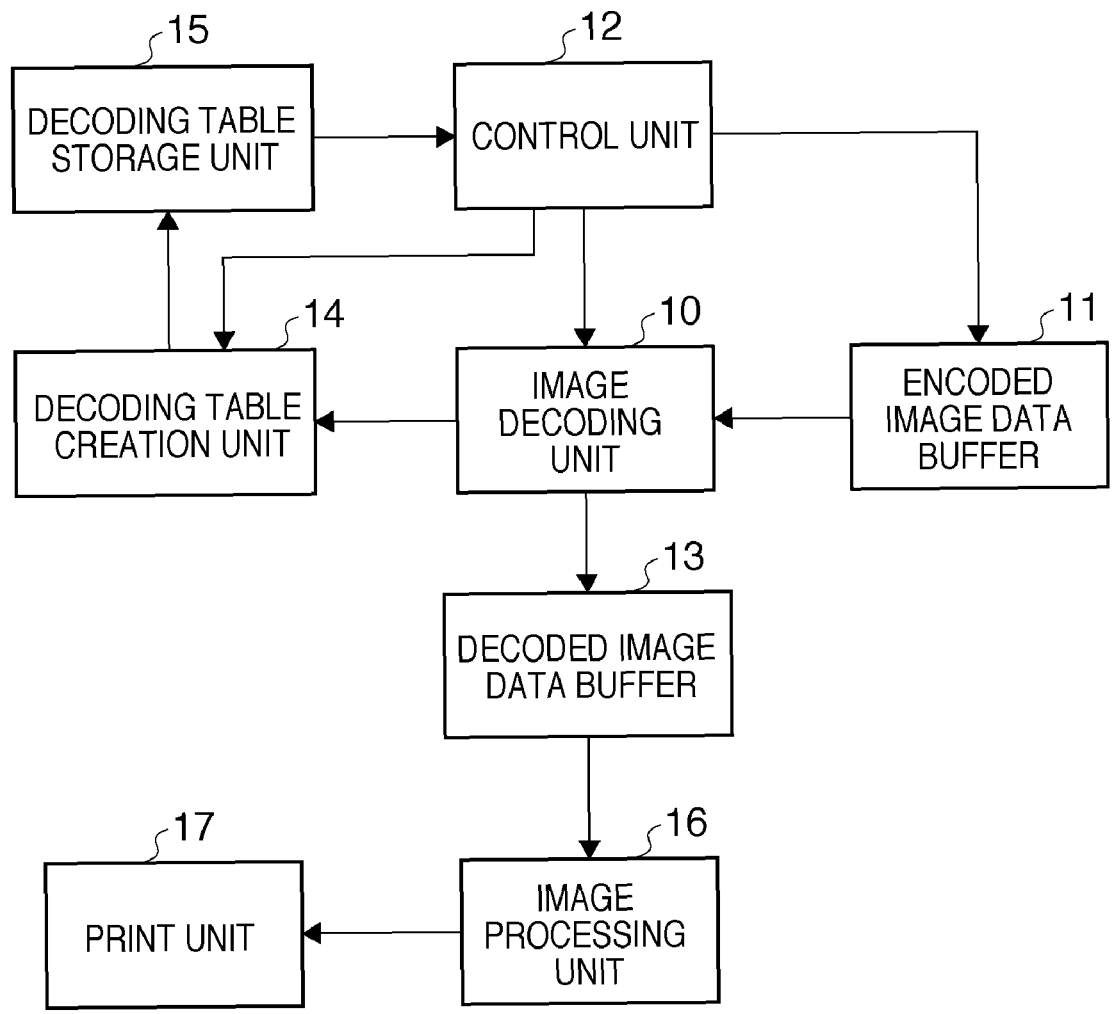
FIG. 2 is a block configuration diagram of a printer to which an embodiment is applied.

The following describes an example in which an image decoding apparatus according to Embodiment 1 has been mounted in a printer. FIG. 2 is a block configuration diagram of the printer.

In FIG. 2, Reference numeral 11 denotes a buffer that stores a file including encoded image data. Reference numeral 10 denotes an image decoding unit that decodes encoded image data that has been input from the encoded image data buffer 11.

The image decoding unit 10 decodes JPEG image data. In JPEG encoding, encoding and decoding are performed in processing units of blocks called MCUs (Minimum Coded Unit) that are each composed of at least one transform coefficient block. Note that although the present embodiment describes an example in which the encoded image data that is targeted for decoding is JPEG encoded image data, the present invention is not limited by the type of encoding. For example, image data that has been encoded by an MPEG encoding scheme may be processed. In other words, the present invention is applicable to any image that has been variable-length encoded in units of pixel blocks such as MCUs. In the process of performing decoding processing, the image decoding unit 10 outputs decoded image data, DC prediction values, and accumulated code lengths.

Reference numeral 12 denotes a control unit that controls the image decoding unit 10 and a decoding table creation unit 14. The control unit 12 also performs processing for receiving an input of JPEG encoded data from an external apparatus and storing the JPEG encoded data in the buffer 11. The input source of the JPEG encoded data may be a host computer connected to the image decoding apparatus or a memory card that has been inserted into a memory card slot.

Reference numeral 13 denotes a decoded image data buffer that stores image data that has been decoded by the image decoding unit 10. Reference numeral 14 denotes a decoding table creation unit that creates a decoding table that holds MCU file pointers and DC prediction values based on DC prediction values (the DC value of a pixel block immediately before a pixel block of interest) and accumulated code lengths output from the image decoding unit 10. Reference numeral 15 denotes a decoding table storage unit that stores the decoding table created by the decoding table creation unit 14.

In JPEG encoding, regarding the DC components among transform coefficients, the DC component of a transform coefficient block constituting an immediately previous MCU is set as a prediction value, and a difference between the prediction value and the DC component of the transform coefficient block of an MCU of interest is encoded. Accordingly, in a case of performing decoding beginning with a certain MCU in an image, it is necessary to hold not only the file pointer of that MCU, but also the DC component value of the transform coefficient block constituting the immediately previous MCU as a DC prediction value.

After performing decoding processing for the first time on encoded image data to create a decoding table, based on an instruction from the control unit 12, the image decoding unit 10 performs partial decoding processing for a second and subsequent time beginning with a predetermined MCU with use of the decoding table. Note that a method for performing partial decoding processing beginning with the predetermined MCU with use of the decoding table is not described here due to being widely known in conventional technology.

Reference numeral 16 denotes an image processing unit that performs various types of image processing for printing on image data that has been decoded by the image decoding apparatus according to the present embodiment. Examples of the image processing performed by the image processing unit 16 include rotating processing, color conversion and conversion to half-tone. Such image processing is not described here due to being widely known by persons skilled in the art. Needless to say, the present invention is not limited by the methods of image processing executed by the image processing unit 16. Reference numeral 17 denotes a print unit that prints image data that has been output from the image processing unit 16. Although image data is output to the print unit 17 in the present embodiment, the present invention is of course not limited to this. For example, image data may be output to a display device.

In many digital cameras, the relationship W>H is satisfied, where W is the number of pixels in the horizontal direction and H is the number of pixels in the vertical direction of the imaging element when the camera is in an upright condition (landscape imaging condition). Also, the encoding order is a raster scan order based on the horizontal direction.

On the other hand, in general, assuming that the maximum size of a recording sheet that can be printed on in a printer apparatus is A4, the range that is recordable by the scan movement of the recording head is designed based on the short side of A4 sized paper in order to reduce cost as well as to reduce the size of the apparatus. The same follows for the print unit 17 in the embodiments. Therefore, it is necessary to decode MCUs in parts in order to decode only a portion of encoded image data that is to be printed by one scan movement of the recording head with use of a low capacity memory. In other words, a characteristic portion of the embodiments is the image decoding unit 10.

Figure 1:
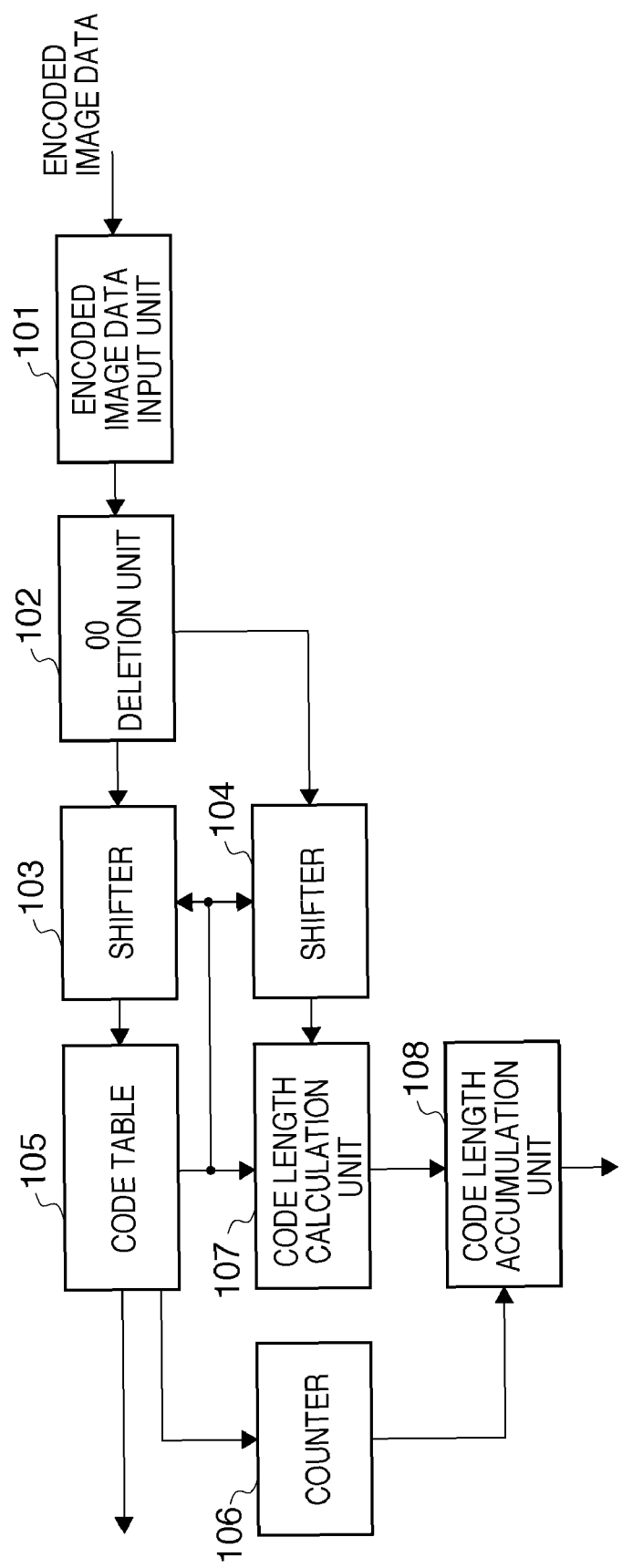
FIG. 1 is a block configuration diagram of an image decoding unit of an image decoding apparatus according to Embodiment 1.

In view of this, a detailed block configuration of the image decoding unit 10 is shown in FIG. 1, and the following describes the content of the processing performed by the image decoding unit 10 in further detail.

Reference numeral 101 denotes an encoded image data input unit that inputs encoded image data from the buffer 11. Reference numeral 102 denotes a 00 deletion unit that detects and deletes "0x00" (an emulation prevention byte) that follows "0xFF" appearing at a byte boundary in encoded image data that has been input via the encoded image data input unit 101. The 00 deletion unit functions as an identification data deletion unit that deletes identification data that is an emulation prevention byte. For example, in the case of the emulation prevention bytes shown in FIG. 3A, the 00 deletion unit 102 outputs encoded image data from which the emulation prevention bytes have been deleted (FIG. 3B), and emulation prevention byte position data indicating a position immediately before each "0x00" (LSB of "0xFF"). As shown in FIG. 3C, in the emulation prevention byte position information, the value of the bit position immediately before each "0x00" (LSB of "0xFF") is set to "1", and the other values are set to "0".

In the present Embodiment 1, the 00deletion unit 102 processes encoded image data two bytes at a time. In a case of detecting an emulation prevention byte, the 00 deletion unit 102 deletes the byte, and therefore outputs the above-described two types of data one byte at a time to a later-described shifter 103 and shifter 104. If an emulation prevention byte is not detected, the 00 deletion unit 102 outputs the two types of data two bytes at a time. Note that the present invention is not limited by the number of bytes processed at a time by the 00 deletion unit 102. For example, the 00 deletion unit 102 may process encoded image data four bytes at a time.

Reference numeral 103 denotes a shifter that cues encoded image data from which emulation prevention bytes have been deleted. Reference numeral 104 denotes a shifter that cues emulation prevention byte position data.

Reference numeral 105 denotes a code table that performs decoding on encoded image data from which emulation prevention bytes have been deleted and that has been cued by the shifter 103, and outputs a code length and decoded data that includes a DC prediction value. The code length output from the code table 105 is input to the shifter 103 and shifter 104, and the encoded image data from which emulation prevention bytes have been deleted and the emulation prevention byte position data are cued by the shifter 103 and shifter 104 respectively.

Reference numeral 107 denotes a code length calculation unit that determines whether an emulation prevention byte is included in encoded image data that has been decoded by the code table 105. The code length calculation unit 107 references the emulation prevention byte position data output from the shifter 104. Specifically, the code length calculation unit 107 determines whether, in the emulation prevention byte position data, "1" is included in the number of bits indicated by the code length output from the code table 105. If "1" is included, an emulation prevention byte is included in the encoded data that has been decoded by the code table 105, and therefore the code length calculation unit 107 adds "8" (the data length (number of bits) of the emulation prevention code) to the code length output from the code table 105. The value resulting from the addition is output to a code length accumulation unit 108. If "1" is not included, an emulation prevention byte is not included in the encoded data that has been decoded by the code table 105, and therefore the code length calculation unit 107 outputs the code length output from the code table 105 without performing addition.

For example, consider a case in which the code length of the last code in the MCU shown in FIG. 3A is 24 bits. Since "1" is included as the 24th bit of the emulation prevention byte position data shown in FIG. 3C, an emulation prevention byte is determined to be included in the encoded data that has been decoded by the code table 105. Accordingly, the code length calculation unit 107 outputs 24+8=32 as the code length to the code length accumulation unit 108. On the other hand, since the shifter 103 and shifter 104 hold data from which emulation prevention bytes have been deleted, the code length before the addition of the emulation prevention byte is input from the code table 105.

Note that if n (n being 1 or more) values of "1" are included in the number of bits indicated by the code length output from the code table 105, 8×n is added to the code length output from the code table 105. In other words, if n emulation prevention bytes are included in the code that has been decoded, 8×n bits are added to the code length decoded by the code table 105.

Reference numeral 108 denotes a code length accumulation unit that accumulates code lengths output from the code length calculation unit 107. Reference numeral 106 denotes a counter that counts the number of transform coefficients that have been decoded by the code table 105. When the number of decoded transform coefficients reaches the number of transform coefficients constituting an MCU, the counter 106 notifies the code length accumulation unit 108 to that effect. For each MCU, the code length accumulation unit 108 outputs the accumulated code length to the decoding table creation unit 14 shown in FIG. 2.

The following describes the decoding table created by the image decoding apparatus according to the present embodiment with reference to FIG. 4A to FIG. 4C.

In the image data shown in FIG. 4A, numbers have been assigned to the MCUs constituting the image data in order to aid the description. The encoded image data shown in FIG. 4B is data corresponding to the MCUs constituting the image data shown in FIG. 4A. The encoded image data in an MCU4 and an MCU10 end with "0xFF" posited at the byte boundary. Therefore, "0x00" that is an emulation prevention byte is appended to end of each "0xFF". The decoding table shown in FIG. 4C is a decoding table that has been created by the image decoding apparatus according to the present embodiment. "0" to "e" in the decoding table correspond to positions (file pointers) of "0" to "e" in the encoded image data and MCUs 1, 3, 5, 7, 9, and 11 in the image data respectively.

In the image decoding apparatus according to the present embodiment, the code length calculation unit 107 calculates a code length based on the emulation prevention byte position data detected by the 00 deletion unit 102 and outputs the code length to the code length accumulation unit 108. If an emulation prevention byte is included in the encoded data that has been decoded by the code table 105, "8", which is the bit length of the emulation prevention byte, is added to the code length of the encoded data, and the resulting code length is accumulated by the code length accumulation unit 108. Accordingly, if an MCU ends with "0xFF" at the byte boundary as shown in FIGS. 4B and 4C, the decoding table creation unit 14 can register the position immediately after the subsequent "0x00" in the decoding table.

Figure 6:
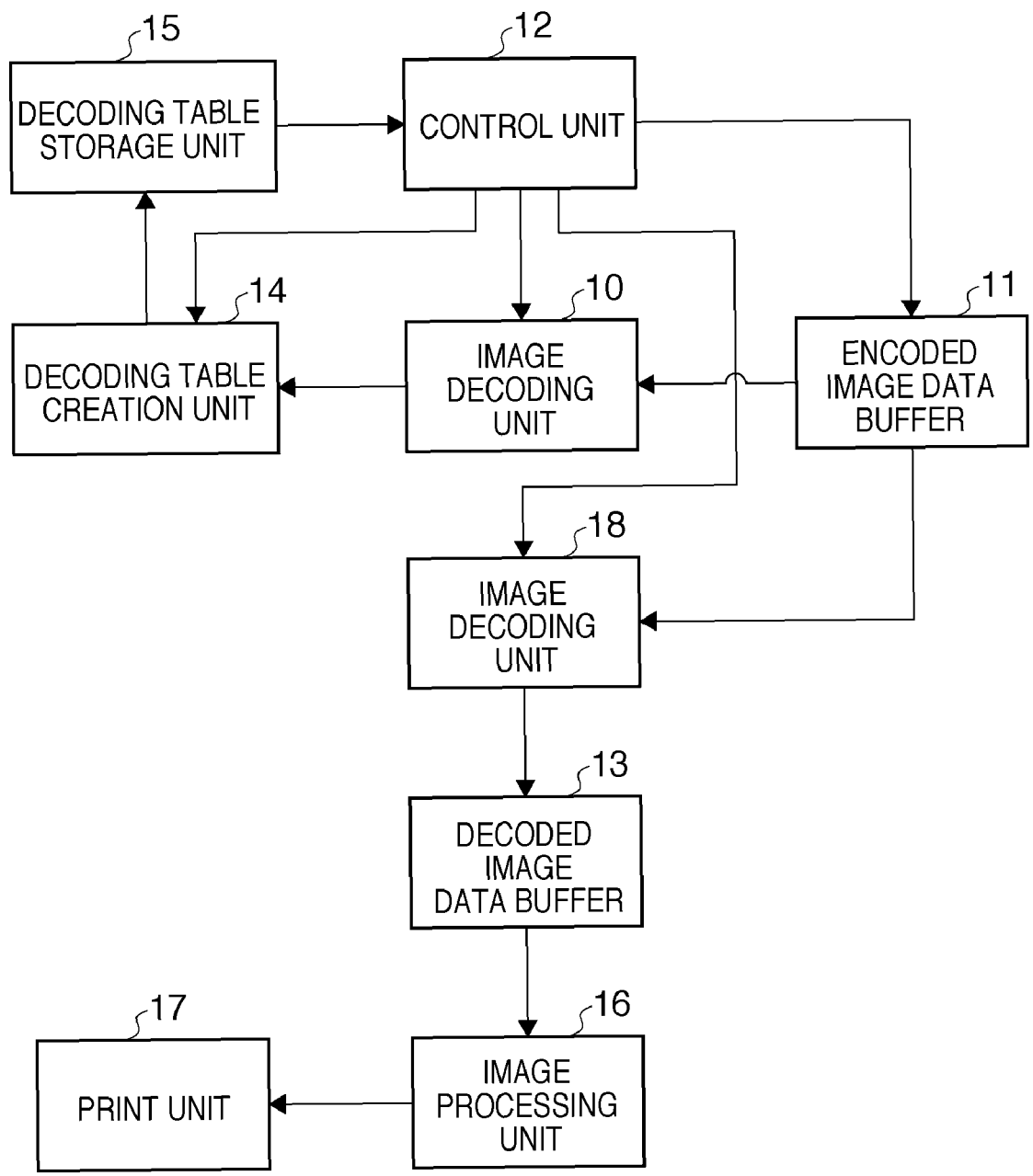
FIG. 6 is a block configuration diagram of another printer according to Embodiment 1.

Note that the image decoding apparatus of the present invention is not limited to the embodiment shown in FIG. 2. As shown in FIG. 6, an image decoding unit 18 (second decoding unit) that is separate from the image decoding unit 10 (first decoding unit) may be caused to reference the decoding table, set a predetermined MCU as an origin point, and perform partial decoding. In this case, if there is a plurality of pieces of encoded image data, the processing for creating decoding tables and the processing for referencing the decoding tables, setting a predetermined MCU as an origin point, and performing partial decoding may be pipelined. For example, while the image decoding unit 18 is performing partial decoding on first encoded image data, the image decoding unit 10 and decoding table creation unit 14 can create a decoding table for second encoded image data.

Embodiment 2

Figure 7:
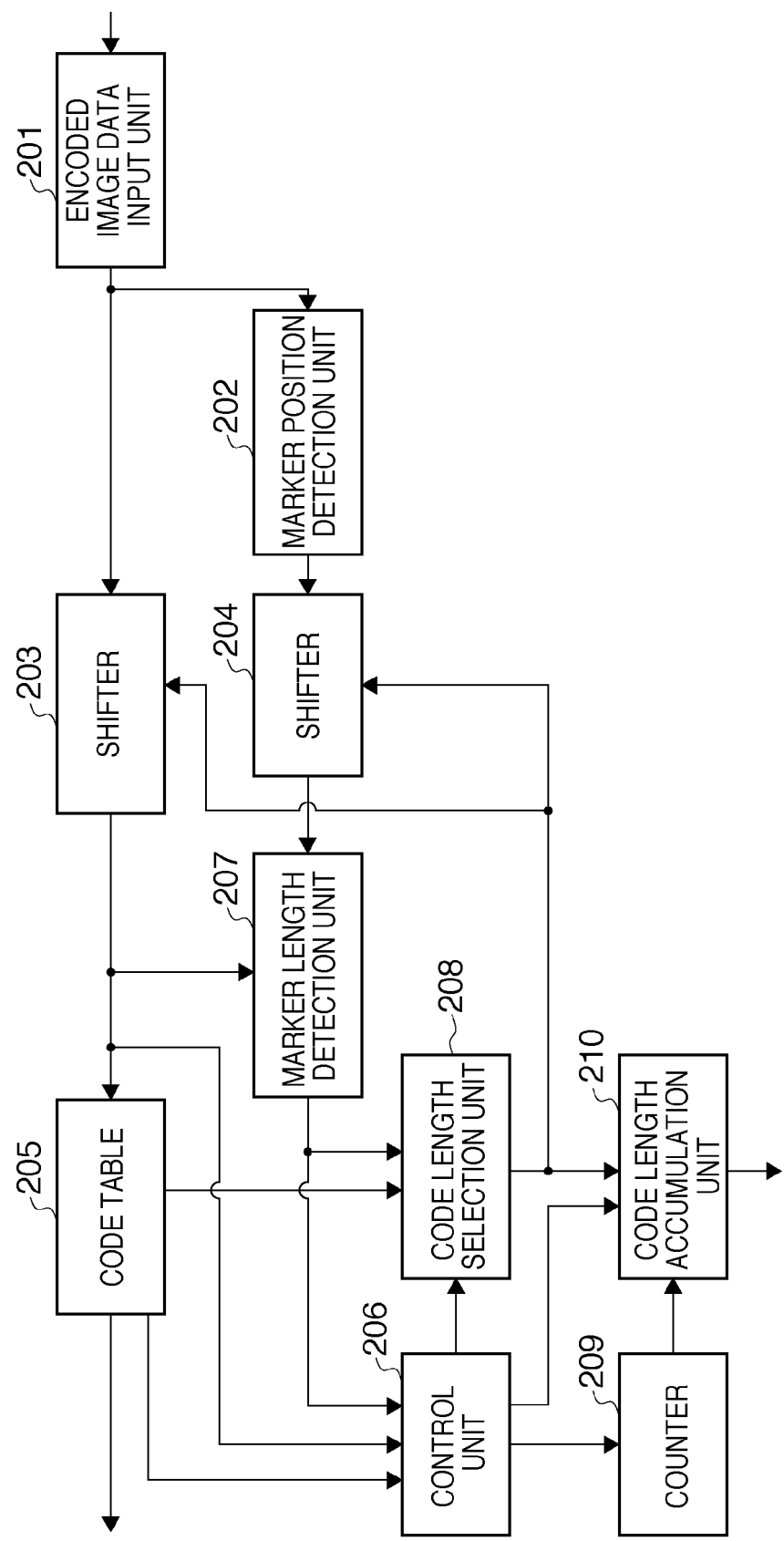
FIG. 7 is a block configuration diagram of an image decoding unit of an image decoding apparatus according to Embodiment 2.
Figure 14:
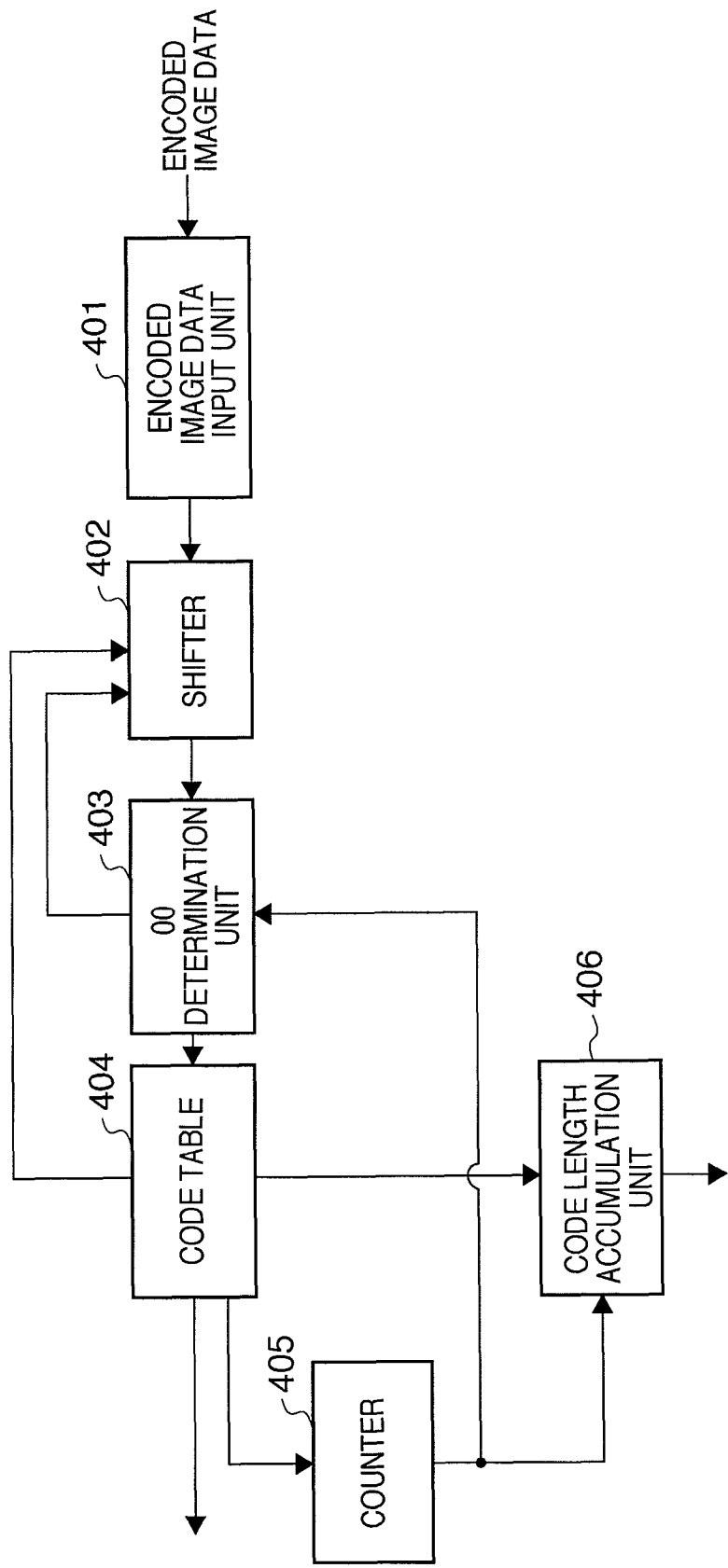
FIG. 14 is a block configuration diagram of an image decoding apparatus according to conventional technology.

The following describes a structure of an image decoding apparatus according to Embodiment 2 with reference to the block diagrams of FIG. 2 and FIG. 7.

The structure of the image decoding apparatus according to the present Embodiment 2 is the same as in the above-described Embodiment 1, with the exception of a detailed internal structure of the image decoding unit 10 shown in FIG. 2. The following describes a detailed structure of the image decoding unit 10 with reference to FIG. 7.

In FIG. 7, 201 denotes an encoded image data input unit that inputs encoded image data. 202 denotes a marker position detection unit that detects marker code that appears at a byte boundary in encoded image data that has been input via the encoded image data input unit 201, and outputs marker code position data. Marker code is composed of "0xFF" at a byte boundary, followed by eight bits of code other than "0x00". FIGS. 8A and 8B show examples of marker code and marker code position data respectively. FIG. 8A shows an example of encoded image data that has been input. The marker code is "0xFFD0". In order to align marker code to a byte boundary, zero to seven padding bits are appended immediately before the marker code. The value of each padding bit is "1". In FIG. 8A, six padding bits have been appended. FIG. 8B shows an example of marker code position data that corresponds to the encoded image data shown in FIG. 8A. In the marker code position data, the values at the bit positions corresponding to "0xFF", which is the first eight bits of the bit string constituting the marker code, are "1", and the values at the other bit positions are "0".

Reference numeral 203 denotes a shifter that cues encoded image data. Reference numeral 204 denotes a shifter that cues marker code position data.

Reference numeral 205 denotes a code table that decodes encoded image data that has been cued by the shifter 203, and outputs a code length and decoded data that includes a DC prediction value. The code length output from the code table 205 is output to a control unit 206 and a code length selection unit 208.

Reference numeral 207 denotes a marker length detection unit that determines whether marker code or a padding bit exists at the head (MSB) of data held by the shifter 203, and in a case of determining affirmatively, outputs a bit length of the marker code or padding bit. The marker length detection unit 207 determines whether marker code or a padding bit exists based on the marker code position data cued by the shifter 204 and the encoded image data cued by the shifter 203. Specifically, the marker length detection unit 207 determines affirmatively if the marker position indicated by the marker code position data is the MSB, or all of the bits to the left of the marker position in the cued encoded image data are "1". For example, in FIG. 9A, since all six bits to the left of the marker position (FIG. 9B) in the cued encoded image data are "1", the marker length detection unit 207 determines that marker code or a padding bit exists.

If marker code or a padding bit exists, the marker length detection unit 207 outputs a total bit length of the marker code or padding bits to the control unit 206 and code length selection unit 208. Otherwise, the marker length detection unit 207 outputs "0".

Reference numeral 208 denotes a code length selection unit that, based on an instruction from the control unit 206, selects either a code length output from the code table 205 or a total bit length output from the marker length detection unit 207. The bit length output from the code length selection unit 208 is input to a code length accumulation unit 210 and the shifter 203 and shifter 204. The shifter 203 and shifter 204 cue data held therein with use of the input bit length as a cue amount.

Reference numeral 206 denotes a control unit that controls the code length selection unit 208 and code length accumulation unit 210. The control unit 206 causes the code length selection unit 208 to select the total bit length output from the marker length detection unit 207 if marker code or a padding bit exists. Otherwise, the control unit 206 causes the code length selection unit 208 to select the code length output from the code table 205. Furthermore, the control unit 206 compares an effective bit length held by the shifter 203 and a total maximum length (15 bits) of the marker code and padding bits. If the effective bit length held by the shifter 203 exceeds the maximum length, the control unit 206 notifies the code length accumulation unit 210 to that effect.

Reference numeral 210 denotes a code length accumulation unit that accumulates code lengths or bit lengths that have been selected by the code length selection unit 208. Reference numeral 209 denotes a counter that counts the number of transform coefficients that have been decoded by the code table 205. When the number of decoded transform coefficients reaches the number of transform coefficients constituting an MCU, the counter 209 notifies the code length accumulation unit 210 to that effect. Upon receiving the notifications from the counter 209 and control unit 206, for each MCU, the code length accumulation unit 210 outputs the accumulated code length to the decoding table creation unit 14 shown in FIG. 2.

The following describes the decoding table created by the image decoding apparatus according to the present Embodiment 2 with reference to FIG. 10A to FIG. 10C.

In the image data shown in FIG. 10A, numbers have been assigned to the MCUs constituting the image data in order to aide the description. The encoded image data shown in FIG. 10B is data corresponding to the MCUs constituting the image data shown in FIG. 10A. "0xFFD1" and "0xFFD3", which are marker code, have been inserted immediately before the encoded image data in an MCU7 and an MCU13 respectively. The decoding table shown in FIG. 10C is a decoding table that has been created by the image decoding apparatus according to the present embodiment. "0" to "g" in the decoding table correspond to positions (file pointers) of "0" to "g" in the encoded image data and MCUs 1, 3, 5, 7, 9, 11, 13, and 15 in the image data respectively.

In the image decoding apparatus of the present Embodiment 2, the effective bit length held in the shifter 203 and the total maximum length (15 bits) of the marker code and padding bits are compared. If the effective bit length exceeds the maximum length, the control unit 206 notifies the code length accumulation unit 210 to that effect, and thereafter, for each MCU, the code length accumulation unit 210 outputs the accumulated code length to the decoding table creation unit 14. In other words, after the control unit 206 has determined whether marker code exists immediately after an MCU, the code length accumulation unit 210 outputs the accumulated code length.

Therefore, positions "c" and "f" that come immediately after marker code are registered in the decoding table as shown in FIG. 10B and FIG. 10C. In a case of setting the MCU7 and MCU13 as origin points and performing partial decoding, encoded image data is input to the image decoding unit 10 beginning with positions "c" and "f" in FIG. 10B, and decoding processing is started. Accordingly, in the image decoding apparatus of the present embodiment, the processing performed with respect to the marker code immediately before the MCU7 and MCU13 is completed at one time, thereby reducing overhead in a case of setting a predetermined MCU as an origin point and performing partial decoding.

Embodiment 3

The following describes a structure of an image decoding apparatus according to the Embodiment 3 of the present invention with reference to the block diagrams of FIG. 2 and FIG. 12.

The structure of the image decoding apparatus according to the present embodiment is the same as in Embodiment 1, with the exception of the detailed internal structure of the image decoding unit 10 shown in FIG. 2. The following describes a detailed structure of the image decoding unit 10 with reference to FIG. 12.

Reference numeral 301 denotes an encoded image data input unit that inputs encoded image data. Reference numeral 302 denotes a 00 deletion/marker position processing unit that detects emulation prevention bytes and marker code in encoded image data that has been input via the encoded image data input unit 301. The 00 deletion/marker position processing unit 302 outputs encoded image data from which emulation prevention bytes have been deleted (FIG. 3B) and emulation prevention byte position data (FIG. 3C) indicating a position immediately before each "0x00" (LSB of "0xFF"). Furthermore, the 00 deletion/marker position processing unit 302 outputs the marker code position data shown in FIG. 8B.

Reference numeral 303 denotes a shifter that cues encoded image data from which emulation prevention bytes have been deleted. Reference numeral 304 denotes a shifter that cues emulation prevention byte position data. Reference numeral 305 denotes a shifter that cues marker code position data.

Reference numeral 306 denotes a code table that performs decoding on encoded image data from which emulation prevention bytes have been deleted and that has been cued by the shifter 303, and outputs a code length and decoded data that includes a DC prediction value. The code length output from the code table 306 is input to a shift amount selection unit 310 and a code length calculation unit 307.

Reference numeral 307 denotes a code length calculation unit that determines whether an emulation prevention byte is included in encoded image data that has been decoded by the code table 306. The code length calculation unit 307 references the emulation prevention byte position data output from the shifter 304, and adds the length of the emulation prevention byte to the code length of the code decoded by the code table 306.

Reference numeral 308 denotes a marker length detection unit that determines whether marker code or a padding bit exists at the head (MSB) of data held by the shifter 303, and in a case of determining affirmatively, outputs a bit length of the marker code or padding bits. The marker length detection unit 308 determines whether marker code or a padding bit exists based on the marker code position data cued by the shifter 305 and the encoded image data cued by the shifter 303. If marker code or a padding bit exists, the marker length detection unit 308 outputs a total bit length of the marker code or padding bits to the control unit 309, shift amount selection unit 310 and code length selection unit 311. Otherwise, the marker length detection unit 308 outputs "0".

Reference numeral 310 denotes a shift amount selection unit that, based on an instruction from the control unit 309, selects either a code length output from the code table 306 or a total bit length output from the marker length detection unit 308. The bit length selected by the shift amount selection unit 310 is input to the shifters 303, 304 and 305 as a number of bits according to which cueing is to be performed.

Reference numeral 311 denotes a code length selection unit that, based on an instruction from the control unit 309, selects either a code length output from the code length calculation unit 307 or a total bit length output from the marker length detection unit 308.

Reference numeral 309 denotes a control unit that controls the code length selection unit 311 and a code length accumulation unit 313. The control unit 309 causes the code length selection unit 311 to select the total bit length output from the marker length detection unit 308 if marker code or a padding bit exists. Otherwise, the control unit 309 causes the code length selection unit 311 to select the code length output from the code length calculation unit 307. Furthermore, the control unit 309 compares an effective bit length held by the shifter 303 and a total maximum length (15 bits) of the marker code and padding bits. If the effective bit length held by the shifter 303 exceeds the maximum length, the control unit 309 notifies the code length accumulation unit 313 to that effect.

Reference numeral 313 denotes a code length accumulation unit that accumulates code lengths or bit lengths that have been selected by the code length selection unit 311. Reference numeral 312 denotes a counter that counts the number of transform coefficients that have been decoded by the code table 306. When the number of decoded transform coefficients reaches the number of transform coefficients constituting an MCU, the counter 312 notifies the code length accumulation unit 313 to that effect. Upon receiving the notifications from the counter 312 and control unit 309, for each MCU, the code length accumulation unit 313 outputs the accumulated code length to the decoding table creation unit 14 shown in FIG. 2.

The following describes the decoding table created by the image decoding apparatus according to the present Embodiment 3 with reference to FIG. 13A to FIG. 13C.

In the image data shown as an example in FIG. 13A, numbers have been assigned to the MCUs constituting the image data in order to aide the description. The encoded image data shown in FIG. 13B is encoded data corresponding to the MCUs constituting the image data shown in FIG. 13A. The encoded image data in an MCU3 and an MCU10 end with "0xFF" positioned at a byte boundary. Therefore, "0x00" that is an emulation prevention byte is appended immediately after each "0xFF". Furthermore, "0xFFD1", which is marker code, has been inserted immediately before the encoded image data in an MCU7.

The decoding table shown as an example in FIG. 13C is a decoding table created by the image decoding apparatus according to the present Embodiment 3. "0" to "e" in the decoding table correspond to positions (file pointers) of "0" to "e" in the encoded image data and MCUs 1, 3, 5, 7, 9, and 11 in the image data respectively.

In the image decoding apparatus of the present Embodiment 3, the code length calculation unit 307 calculates a code length based on the emulation prevention byte position data detected by the 00 deletion/marker position processing unit 302, and outputs the code length to the code length accumulation unit 313. If an emulation prevention byte is included in the encoded data that has been decoded by the code table 306, "8", which is the bit length of the emulation prevention byte, is added to the code length output from the code length calculation unit 307, and the resulting code length is accumulated by the code length accumulation unit 313. Accordingly, if an MCU ends with "0xFF" at the byte boundary as shown in FIG. 13B, the decoding table creation unit 14 can register the position immediately after the subsequent "0x00" in the decoding table.

Furthermore, in the image decoding apparatus of the present Embodiment 3, the effective bit length held in the shifter 303 and the total maximum length (15 bits) of the marker code and padding bits are compared. If the effective bit length exceeds the maximum length, the control unit 309 notifies the code length accumulation unit 313 to that effect, and thereafter, for each MCU, the code length accumulation unit 313 outputs the accumulated code length to the decoding table creation unit 14. In other words, after the control unit 309 has determined whether marker code exists immediately after an MCU, the code length accumulation unit 313 outputs the accumulated code length.

Therefore, position "c", which is immediately after the marker code, is registered in the decoding table as shown in FIG. 13B and FIG. 13C. In a case of setting the MCU7 as the origin point and performing partial decoding, encoded image data is input to the image decoding unit 10 beginning from the position "c" in FIG. 13B, and decoding processing is started. Accordingly, in the image decoding apparatus of the present Embodiment 3, the processing performed with respect to the marker code immediately before the MCU7 is completed at one time, thereby reducing overhead in a case of setting a predetermined MCU as an origin point and performing partial decoding.

As described above, according to the present embodiment, whether identification data was included in encoded image data that has been decoded is determined based on identification data position information. Based on a result of the determination, the length of the identification data is added to the code length of the decoded code in advance, and the result is accumulated and output in units of blocks. Accordingly, a position immediately after the identification data can be reliably registered in a decoding table without determining whether the code word at the end of a block has been reached, thereby enabling performing high-speed decoding processing. Furthermore, since the position immediately after the marker code is stored in the decoding table, the processing performed with respect to the marker code can be completed at one time when creating a decoding table, thereby shortening the decoding processing time.

Therefore, according Embodiments 1 to 3, decoding processing can be effectively executed randomly in units of blocks based on encoded image data that has been variable-length encoded in units of blocks and furthermore has marker code inserted therein, as in the case of JPEG encoded image data.

Other Embodiments

The above embodiments describe examples in which the image data to be decoded is constituted from four MCUs (blocks) in the horizontal direction and three MCUs (blocks) in the vertical direction. Note that such examples are used in order to simplify the description.

In other words, the image data targeted for decoding is defined as image data constituted from M (M>1) blocks in the horizontal direction and N (N>1) blocks in the vertical direction, and furthermore, in a case of decoding an image in an area having a size expressed by L (L<M) blocks in the horizontal direction and N blocks in the vertical direction in decoding processing, it is sufficient to register storage address information for encoded image data in blocks positioned at a block interval of L blocks in the horizontal direction in a decoding table. It is then sufficient to decode encoded data in L blocks beginning with the blocks indicated by the registered address information.

In the present invention, processing equivalent to Embodiments 1 to 3 can be realized by a computer program. In this case, it is sufficient for each of the constituent elements such as shown in FIG. 1 to function as mathematical functions or subroutines.

Normally, a computer program is stored on a computer-readable storage medium such as a CD-ROM, and can be executed by being placed in a reading apparatus (CD-ROM drive or the like) included in a computer and being copied to or installed in a system. Therefore, such a computer-readable storage medium also clearly falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-106113, filed Apr. 15,2008, which is hereby incorporated by reference herein in its entirety.

What is claimed is:

1. An image decoding apparatus that decodes encoded image data, the encoded image data having been encoded in units of blocks and having predetermined identification data inserted therein, comprising:
    an identification data deletion unit that detects the identification data inserted in the encoded image data, outputs information indicating a position of the identification data, deletes the identification data inserted in the encoded image data, and outputs encoded image data from which the identification data has been deleted;
    a first decoding unit that decodes the encoded image data from which the identification data has been deleted by the identification data deletion unit, and outputs a code length;
    a determination unit that determines, based on the identification data position information output from the identification data deletion unit, whether the identification data was included in the encoded image data that has been decoded by the first decoding unit, and in case of determining that the identification data was included, adds a length of the identification data to the code length output from the first decoding unit;
    an accumulation unit that accumulates the code length to which the length of the identification data has been added by the determination unit, and outputs the accumulated code length in units of blocks;
    a registration unit that, based on the accumulated code length output from the accumulation unit, registers storage address information pertaining to encoded data that corresponds to a predetermined block in the encoded image data in a decoding table; and
    a second decoding unit that decodes encoded image data in a predetermined number of blocks beginning with a position of the predetermined block, in accordance with the address information registered in the decoding table by the registration unit.

2. The image decoding apparatus of claim 1,
    wherein, the identification data is marker code or an emulation prevention code that prevents emulation of the marker code,
    if a code word of interest is the emulation prevention code, the determination unit adds a data length of the emulation prevention code to the code length output from the first decoding unit, and
    if the code word of interest is the marker code, the determination unit adds a data length of the marker code to the code length output from the first decoding unit.

3. The image decoding apparatus of claim 1,
    wherein, the encoded image data targeted for decoding is constituted from M (M>1) blocks in a horizontal direction and N (N>1) blocks in a vertical direction, and in a case of the second decoding unit decoding an image in an area whose size is expressed by L (L<M) blocks in the horizontal direction and N blocks in the vertical direction, the registration unit registers, in the decoding table, storage address information pertaining to encoded data that corresponds to each block positioned at an interval of L blocks in the horizontal direction.

4. The image decoding apparatus of claim 1, further comprising a print processing unit that performs print processing in units of an image in an area composed of L blocks in a horizontal direction and N blocks in a vertical direction, the blocks having been decoded by the second decoding unit.

5. A computer-readable non-transitory storage medium retrievably storing a computer program that, upon being read to and executed by a computer, causes the computer to function as an image decoding apparatus according to claim 1.

6. A method for controlling an image decoding apparatus that decodes encoded image data, the encoded image data having been encoded in units of blocks and having predetermined identification data inserted therein, comprising the steps of:
    detecting the identification data inserted in the encoded image data, outputting information indicating a position of the identification data, deleting the identification data inserted in the encoded image data, and outputting encoded image data from which the identification data has been deleted;
    decoding the encoded image data from which the identification data has been deleted in the identification data deletion step, and outputting a code length;
    determining, based on the identification data position information output in the identification data deletion step, whether the identification data was included in the encoded image data that has been decoded in the first decoding step, and in case of determining that the identification data was included, adding a length of the identification data to the code length output in the first decoding step;

accumulating the code length to which the length of the identification data has been added in the determination step, and outputting the accumulated code length in units of blocks;

registering, based on the accumulated code length output in the accumulation step, storage address information pertaining to encoded data that corresponds to a predetermined block in the encoded image data in a decoding table; and decoding encoded image data in a predetermined number of blocks beginning with a position of the predetermined block, in accordance with the address information registered in the decoding table in the registration step.

* * * * *